US008775620B2

(12) United States Patent
Song et al.

(10) Patent No.: US 8,775,620 B2
(45) Date of Patent: Jul. 8, 2014

(54) MULTIMEDIA MIDDLEWARE APPARATUS USING METADATA, METHOD FOR CONTROLLING MULTIMEDIA MIDDLEWARE, AND STORAGE MEDIUM THEREOF

(75) Inventors: Young-Joo Song, Suwon-si (KR); Ki-Ho Jung, Gwacheon-si (KR); Mun-Churl Kim, Daejeon (KR); Hendry, Daejeon (KR); Kook-Heui Lee, Yongin-si (KR)

(73) Assignees: Samsung Electronics Co., Ltd., Suwon-si (KR); Information and Communications University, Research and Industrial Cooperation Group, Daejeon (KR)

( * ) Notice: Subject to any disclaimer, the term of this patent is extended or adjusted under 35 U.S.C. 154(b) by 941 days.

(21) Appl. No.: 11/546,572

(22) Filed: Oct. 12, 2006

(65) Prior Publication Data

US 2007/0088710 A1 Apr. 19, 2007

(30) Foreign Application Priority Data

Oct. 12, 2005 (KR) ........................ 10-2005-0096297

(51) Int. Cl.
*G06F 17/30* (2006.01)
(52) U.S. Cl.
USPC ........................................................ 709/226
(58) Field of Classification Search
USPC ........................................................ 709/226
See application file for complete search history.

(56) References Cited

U.S. PATENT DOCUMENTS

| 5,892,900 | A | * | 4/1999 | Ginter et al. ..................... 726/26 |
| 6,704,750 | B2 | | 3/2004 | Asazu |
| 2005/0108771 | A1 | * | 5/2005 | Kim .............................. 725/132 |
| 2005/0165826 | A1 | * | 7/2005 | Ho et al. ........................ 707/102 |
| 2005/0270423 | A1 | * | 12/2005 | Matsunaga ................... 348/563 |

FOREIGN PATENT DOCUMENTS

| DE | 102 11 426 A1 | 10/2003 |
| JP | 10-187456 A | 7/1998 |
| JP | 2002099413 A | 4/2002 |
| JP | 2004/078728 A | 3/2004 |
| JP | 2005242984 A | 9/2005 |
| KR | 10-2005-0047759 A | 5/2005 |
| WO | WO 2004/019210 A1 | 3/2004 |
| WO | WO 2004/114144 A1 | 12/2004 |
| WO | WO 2005/031570 A1 | 4/2005 |

OTHER PUBLICATIONS

Langer, "Analysis and Design of Information Systems" 2001, 1 pg.*
Peng Gong et al.; An Intelligent Middleware for Dynamic Integration of Heterogeneous Health Care Applications; pp. 1-8.

(Continued)

*Primary Examiner* — Sulaiman Nooristany
(74) *Attorney, Agent, or Firm* — Roylance, Abrams, Berdo & Goodman L.L.P.

(57) ABSTRACT

A multimedia middleware apparatus using metadata, a control method and a storage medium are provided which can receive metadata in multimedia middleware provided in a terminal, easily add/delete/change a service, and effectively maintain and manage middleware components. When an open multimedia terminal processes multimedia contents, a multimedia middleware service structure for expressing information of a name, configuration, version and application programming interface (API) update is configured in the form of metadata. Lists of standard and non-standard services of multimedia middleware are then generated and managed.

25 Claims, 7 Drawing Sheets

(56) References Cited

OTHER PUBLICATIONS

MMPF, The Middleware of MMPF Architechrure, Takashi Hibi et al., Mar. 7, 2002, p. 96.
A Study on Interoperability of Contents on Distributed Processing Environment, OPNET Modeler, pp. 35-43.

NTT Technical Journal Structure of a Multimedia System in ITU-T (Trend of SG16), Jan. 1, 1999, 3 pages (78-81).
QoS Middleware for Internet Multimedia Streaming, Jeffrey Ti Dar Lo et al., Aug. 25, 1998, 5 pages (35-41).

* cited by examiner

MULTIMEDIA MIDDLEWARE APPARATUS USING METADATA, METHOD FOR CONTROLLING MULTIMEDIA MIDDLEWARE, AND STORAGE MEDIUM THEREOF

CROSS-REFERENCE TO RELATED PATENT APPLICATION

This application claims the benefit under 35 U.S.C. §119(a) of a Korean Patent Application filed in the Korean Intellectual Property Office on Oct. 12, 2005 and assigned Serial No. 2005-96297, the entire disclosure of which is hereby incorporated by reference.

BACKGROUND OF THE INVENTION

1. Field of the Invention

The present invention generally relates to a middleware technology for interworking between a physical network and a higher application in a wired/wireless communication network. More particularly, the present invention relates to a multimedia middleware apparatus using metadata, a control method, and a storage medium that can easily maintain and manage multimedia middleware service components.

2. Description of the Related Art

Middleware is a software layer for use in interworking for a data exchange, and the like, between applications or between an application and a network for providing the services of identification, authentication, security, control, multimedia, and the like, related to devices thereon. That is, when a network connects to an application or applications directly connect to each other, codes should be added to all related applications for communicating with network devices or other applications. Because the middleware supports interworking between a network and an application or between applications, a difficult work for adding codes to the related applications can be omitted.

Among various middleware technologies, a multimedia middleware technology supports, for example, on-line content, Internet broadcast, or digital data broadcast reception. For example, a communication network using the multimedia middleware may be a mobile communication network for providing various packet services to mobile terminals like mobile phones, and the like.

The conventional mobile terminal manufacturers have designed, manufactured, and sold mobile terminals with hardware and software considering functions and services requested by users. However, because a design change is required at every time with the rapid development of mobile communication markets and various requests of the users, a conventional method for designing mobile terminals does not provide sufficient flexibility that can satisfy market requests.

Thus, the mobile terminal manufacturers have proposed a middleware technology for interfacing between a platform of a mobile terminal and a higher application while considering limitations in the conventional mobile terminal design method. Whenever a new application is embedded using the middleware technology, various middleware applications can be supported without largely changing a design of the mobile terminal.

In an example of the mobile communication network, the conventional multimedia middleware technology is provided in the form of a binary executable file or a binary library file in which middleware service components are simply implemented. Thus, the conventional multimedia middleware is used by calling an associated binary executable file or an associated binary library file while a multimedia application runs. A multimedia processing function of middleware is managed by reconfiguring service components and replacing an existing service component file when a new function is added to the service components.

Because the conventional multimedia middleware should reconfigure service components whenever a new function is added to the service components, it is difficult to maintain the service components. Further, because the existing service components should be replaced for a new multimedia application, there is a significant inconvenience in managing middleware.

Accordingly, there is a need for an improved multimedia middleware apparatus and method that maintains the multimedia middleware service components and manages the multimedia middleware.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a multimedia middleware apparatus using metadata, a control method and a storage medium that can easily maintain and manage multimedia middleware service components.

Moreover, an aspect of exemplary embodiments of the present invention provides a multimedia middleware apparatus using metadata, a control method and a storage medium that can easily add/delete/change a service by managing a list of multimedia middleware services.

In accordance with an aspect of exemplary embodiments of the present invention, there is provided a multimedia middleware apparatus of a terminal for supporting a multimedia application, in which a service metadata reception section receives metadata comprising middleware application programming interface (API) information as structural information of at least one multimedia middleware service to run a multimedia application, a service implementation code acquisition section acquires a service implementation code related to the metadata needed for the at least one multimedia middleware service, and a service management section identifies the service implementation code needed for the at least one multimedia middleware service from the received metadata and controlling an operation for applying the service implementation code acquired by the service implementation code acquisition section to an associated multimedia middleware service.

In accordance with another aspect of exemplary embodiments of the present invention, there is provided a method for controlling multimedia middleware of a terminal for supporting a multimedia application, in which metadata comprising middleware application programming interface (API) information is received as structural information of at least one multimedia middleware service to run a multimedia application, a service implementation code related to the metadata required for the at least one multimedia middleware service is acquired, and the acquired service implementation code is applied to an associated multimedia middleware service.

In accordance with yet another aspect of exemplary embodiments of the present invention, there is provided a storage medium for recording multimedia middleware for supporting a multimedia application, in which a service metadata reception section receives metadata comprising middleware application programming interface (API) information as structural information of at least one multimedia middleware service to run a multimedia application, a service implementation code acquisition section acquires a service implementation code related to the metadata required for the at least one multimedia middleware service, and a service management section identifies the service implementation code required for the at least one multimedia middleware service from the received metadata and controls an operation for applying the service implementation code acquired by the service implementation code acquisition section to an associated multimedia middleware service.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention express a middleware service of a terminal requiring a multimedia application in the form of metadata. In general, the metadata is structured data used to describe other data, and is data assigned to contents in a regular rule such that desired information is efficiently retrieved and used from among a large amount of information. In the exemplary embodiments of present invention, the metadata includes structural information of a multimedia middleware service.

Further, exemplary embodiments of the present invention propose an installation of a module for implementing a new standard or non-standard service in multimedia middleware by generating and managing metadata of a structure of standard and non-standard services and open multimedia middleware for deleting and changing a service implementation module by referring to structural lists of the standard and non-standard services such that a module for implementing the existing standard and non-standard services can be easily deleted and changed.

Figure 1:
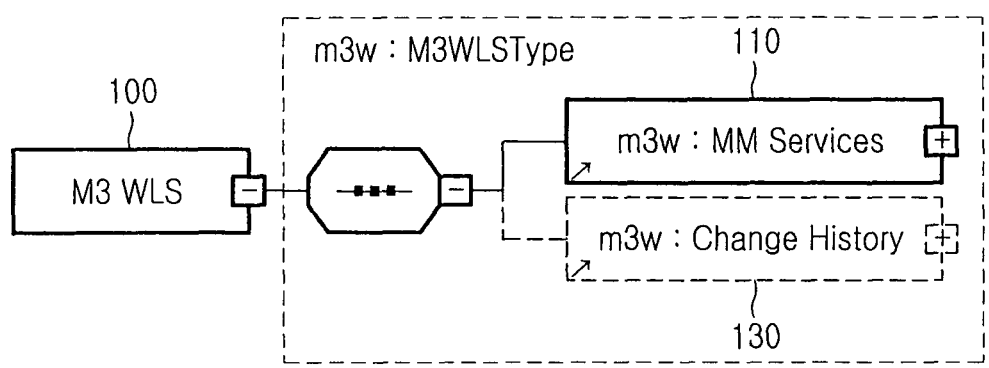
FIG. 1 illustrates a metadata structure for expressing a list of middleware services in accordance with an exemplary embodiment of the present invention.

To model the multimedia middleware service, the exemplary embodiments of the present invention expresses name, configuration, version and application programming interface (API) update information in the form of an extensible markup language (XML) schema. Herein, the XML is one of the universal languages for employing data on the web. The exemplary embodiments of the present invention generate metadata for a multimedia middleware service structure based on a model of the XML schema form and manage the metadata on the service structure information in multimedia middleware. Herein, it is assumed that a service or multimedia service is a multimedia middleware service. FIG. 1 illustrates a metadata (or Moving Pictures Experts Group (MPEG) multimedia middleware logical service (M3WLS)) structure for expressing a list of middleware services in accordance with an exemplary embodiment of the present invention.

Metadata (M3WLS) 100 defined in an exemplary embodiment of the present invention includes elements of a multimedia middleware service container or MM services 110 and a change history 130 of a multimedia middleware application programming interface (API) as illustrated in FIG. 1. Although not illustrated in FIG. 1, the metadata (M3WLS) 100 of FIG. 1 includes attributes of version information for managing a multimedia middleware service, an issue date of multimedia middleware, and position information (or documentationRef) for referring to an associated service document.

An XML description for expressing a metadata structure of the multimedia middleware service in the present invention is as follows.

<XML description for expressing the metadata structure of the middleware service>

```
<element name="M3WLS" type="m3w:M3WLSType"/>
    <complexType name="M3WLSType">
        <sequence>
            <element ref="m3w:MMServices"/>
            <element ref="m3w:ChangeHistory" minOccurs="0"/>
        </sequence>
        <attribute name="version" type="string" use="required"/>
        <attribute name="date" type="date" use="optional"/>
        <attribute name="documentationRef" type="anyURI"
            use="optional"/>
</complexType>
```

In the XML description for expressing the metadata structure of FIG. 1, the multimedia middleware service container 110 is a set of multimedia middleware services to be supported in multimedia middleware. As indicated by a dotted line in FIG. 1, the change history 130 of the multimedia middleware API is a container for describing addition, modification, and deletion of an item within the multimedia middleware. For example, the item includes at least one of a multimedia middleware parameter class type, a MM service, and a multimedia middleware service method as described below.

In the XML description, the "version" is version information of the associated metadata (M3WLS), the "date" is an issue date of the associated metadata (M3WLS), and the "documentationRef" is a reference position of a document related to the associated metadata (M3WLS).

Figure 2:
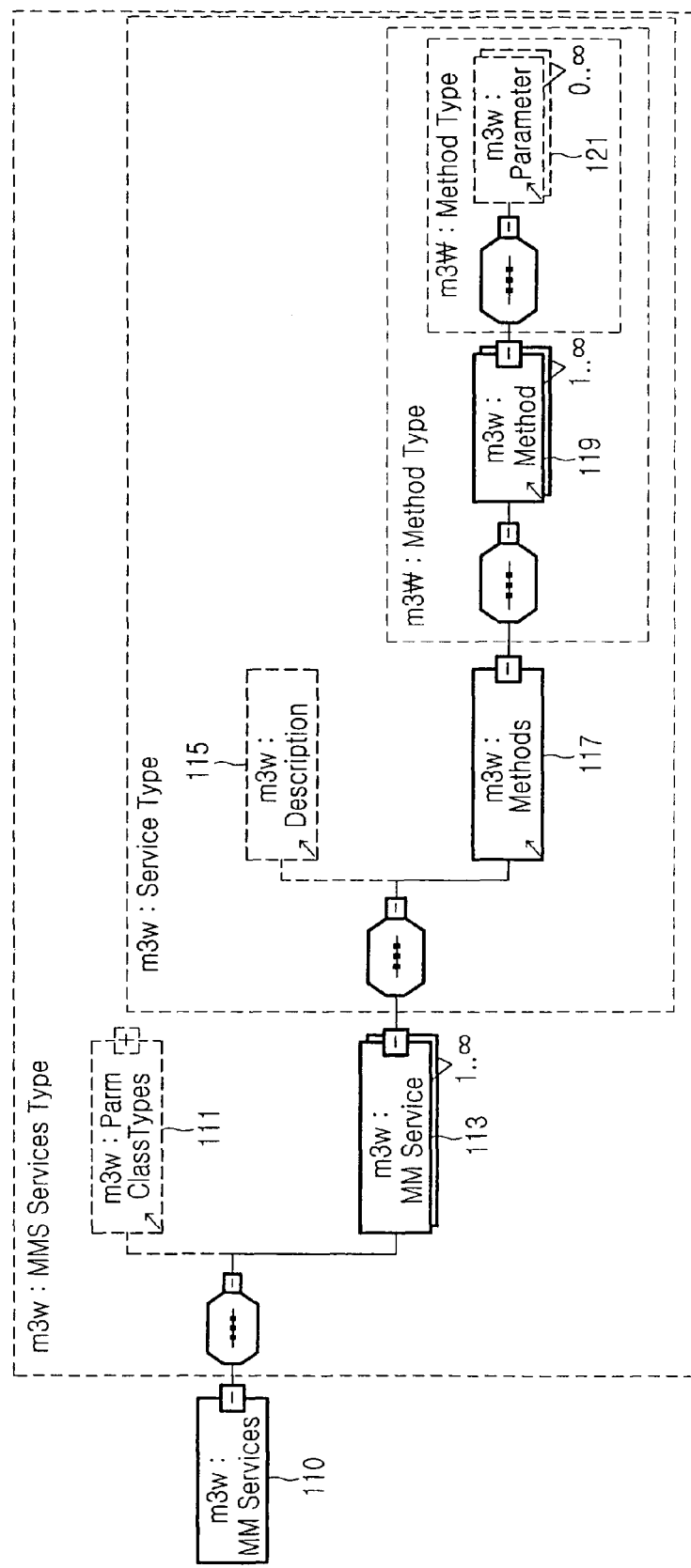
FIG. 2 illustrates an example of a metadata structure of a multimedia middleware service container illustrated in FIG. 1.

FIG. 2 illustrates an example of a metadata structure of the multimedia middleware service container or MM services 110 illustrated in FIG. 1.

In FIG. 2, the multimedia middleware service container or MM services 110 can include multimedia middleware parameter class types 111 and MM services 113. First, the multimedia middleware parameter class types 111 will be described in detail with reference to FIG. 3. The MM services 113 include attributes of a service identifier (ID) and name of each multimedia middleware service and M3W standard service information, and include element values of multimedia middleware service methods 117 and a description 115 of each multimedia middleware service method. In this case, each multimedia middleware service method 119 includes elements of parameters 121. Further, each multimedia middleware service method 119 includes attributes of its name and a result (or output) type of the associated method (that is, API). The multimedia middleware service method 119 describes the associated API. The parameters 121 include name, type and optional attributes. The parameters 121 are parameters of the associated API.

An XML description for expressing the multimedia middleware service is as follows.

```
<element name="MMServices" type="m3w:MMServicesType"/>
<complexType name="MMServicesType">
    <sequence>
        <element ref="m3w:ParamClassTypes" minOccurs="0"/>
        <element ref="m3w:MMService" maxOccurs="unbounded"/>
    </sequence>
</complexType>
<element name="MMService" type="m3w:MMServiceType"/>
<complexType name="MMServiceType">
    <sequence>
        <element ref="m3w:Description" minOccurs="0"/>
        <element ref="m3w:Methods"/>
    </sequence>
    <attribute name="serviceID" type="string" use="required"/>
    <attribute name="name" type="string" use="required"/>
    <attribute name="M3WStandardService" type="boolean" use="optional" default="true"/>
</complexType>
<element name="Methods" type="m3w:MethodsType"/>
    <complexType name="MethodsType">
        <sequence>
            <element ref="m3w:Method" maxOccurs="unbounded"/>
        </sequence>
</complexType>
<element name="Method" type="m3w:MethodType"/>
<complexType name="MethodType">
    <sequence>
        <element ref="m3w:Parameter" minOccurs="0" maxOccurs="unbounded"/>
    </sequence>
    <attribute name="name" type="string" use="required"/>
    <attribute name="output" type="string" use="required"/>
</complexType>
 <element name="Parameter" type="m3w:ParameterType"/>
    <complexType name="ParameterType">
        <attribute name="name" type="string" use="required"/>
        <attribute name="type" type="string" use="required"/>
        <attribute name="optional" type="boolean" use="optional" default="false"/>
</complexType>
```

Figure 3:
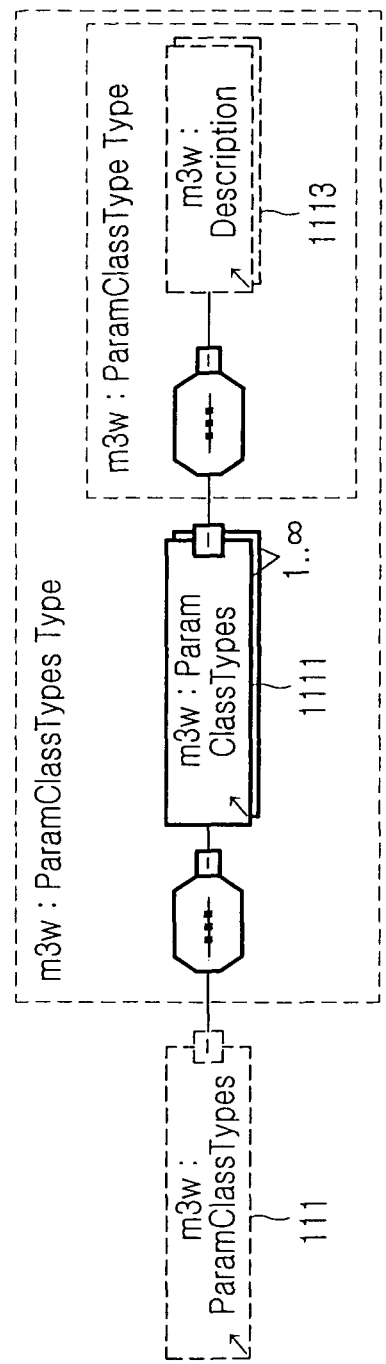
FIG. 3 illustrates an example of a metadata structure of multimedia middleware parameter class types illustrated in FIG. 2.

FIG. 3 illustrates an example of a metadata structure of the multimedia middleware parameter class types 111 illustrated in FIG. 2. In FIG. 3, the multimedia middleware parameter class types 111 are a set of class types of parameters used for each multimedia middleware service method 119. Individual multimedia middleware parameter class types 1111 have an element value of a description 1113 of an associated parameter class type and have an attribute of a name of the parameter class type. An XML description for expressing the multimedia middleware parameter class types 1111 is as follows.

<XML description for expressing the multimedia middleware parameter class types>

```
<element name="ParamClassTypes" type="m3w:ParamClassTypesType"/>
    <complexType name=" ParamClassTypesType ">
        <sequence>
            <element ref="m3w:ParamClassType" maxOccurs="unbounded"/>
        </sequence>
</complexType>
<element name="ParamClassType" type="m3w: ParamClassTypeType"/>
    <complexType name="ParamClassType">
        <sequence>
            <element ref="m3w:Description" minOccurs="0"/>
        </sequence>
        <attribute name="name" type="string" use="required"/>
</complexType>
```

Figure 4:
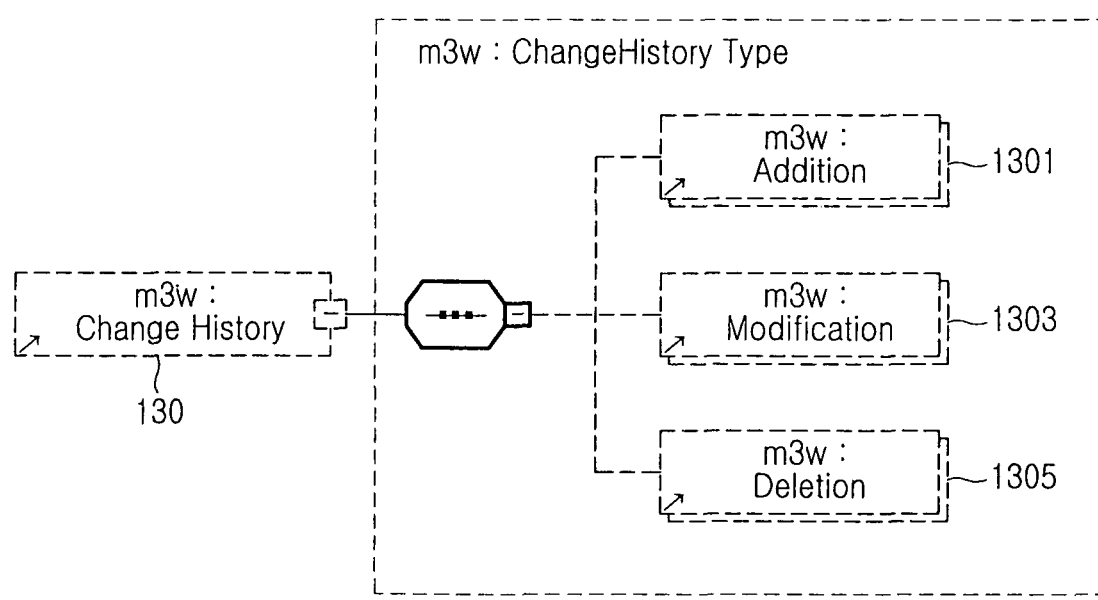
FIG. 4 illustrates an example of a metadata structure of a change history of a multimedia middleware application program interface (API) illustrated in FIG. 1.

FIG. 4 illustrates an example of a metadata structure of the change history of the multimedia middleware API illustrated in FIG. 1.

In FIG. 4, the change history 130 of the multimedia middleware API includes addition information 1301, modification information 1303, and deletion information 1305. For example, data (or object) to be added, modified or deleted includes at least one of the multimedia middleware parameter class type, the MM service, and the multimedia middleware service method as described in the following XML description.

First, the addition information 1301 has an attribute of a name of added data (or object) for indicating which data (or object) has been added among the multimedia middleware parameter class type 1111, the MM service 113, and the multimedia middleware service method 119 for describing the multimedia middleware API. Similarly, the modification information 1303 has an attribute of a name of modified data (or object) for indicating which data (or object) has been modified among the multimedia middleware parameter class type 1111, the MM service 113, and the multimedia middleware service method 119 for describing the multimedia middleware API. Further, the deletion information 1305 has an attribute of a name of deleted data (or object) for indicating which data (or object) has been deleted among the multimedia middleware parameter class type 1111, the multimedia middleware service 113, and the multimedia middleware service method 119 for describing the multimedia middleware API.

An XML description for expressing the change history 130 of the multimedia middleware API is as follows.
<XML description for expressing the change history of the multimedia middleware API> can serve as various wired/wireless communication networks. Further, the multimedia application provider 530 may be a server for providing a multimedia application or a storage medium containing the multimedia application. The application is executable codes of contents, metadata, or multimedia middleware services, that is, service implementation codes. The terminal 510 includes a multimedia service application (processing) block 511 for running an application in a higher layer, a multimedia middleware block 513 for processing the metadata and service implementation codes received through the network 520 or the storage medium, and a platform block 515 in which a basic operating system (OS) for supporting the multimedia service of the terminal 510 is embedded.

Figure 6:
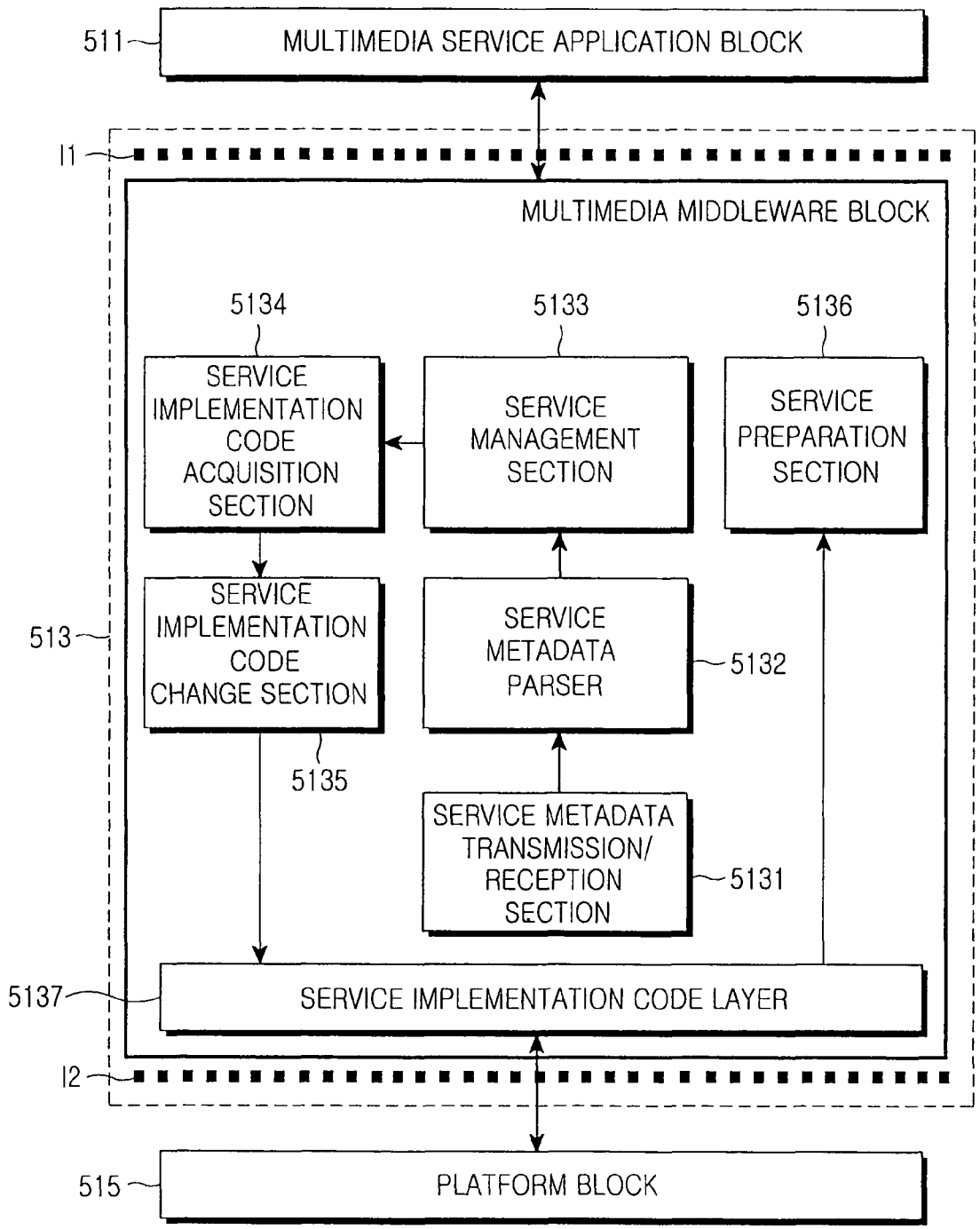
FIG. 6 is a block diagram illustrating a structure of a terminal with a multimedia middleware apparatus using metadata in accordance with an exemplary embodiment of the present invention.

FIG. 6 is a block diagram illustrating a structure of the terminal 510 with multimedia middleware using metadata in accordance with an exemplary embodiment of the present invention.

Referring to FIG. 6, the multimedia middleware block 513 of the terminal 510 connects to the multimedia service application block 511 through an application layer interface 11 and connects to the platform block 515 through a platform layer interface 12.

A service management section 5133 corresponding to a controller of the multimedia middleware block 513 manages metadata of a multimedia middleware service in accordance

```
<element name="ChangeHistory" type="m3w:ChangeHistoryType"/>
    <complexType name="ChangeHistoryType">
        <sequence>
            <element ref="m3w:Addition" minOccurs="0" maxOccurs="unbounded"/>
            <element ref="m3w:Modification" minOccurs="0" maxOccurs="unbounded"/>
            <element ref="m3w:Deletion" minOccurs="0" maxOccurs="unbounded"/>
        </sequence>
    </complexType>
    <simpleType name="DataTypeType">
        <restriction base="string">
            <enumeration value="ParamClassType"/>
            <enumeration value="MMService"/>
            <enumeration value="Method"/>
        </restriction>
    </simpleType>
    <element name="Addition" type="m3w:DataChangeType"/>
    <complexType name="DataChangeType">
        <attribute name="object" type="m3w:DataTypeType" use="required"/>
        <attribute name="name" type="string" use="required"/>
    </complexType>
    <element name="Modification" type="m3w:DataChangeType"/>
    <complexType name="DataChangeType">
        <attribute name="object" type="m3w:DataTypeType" use="required"/>
        <attribute name="name" type="string" use="required"/>
    </complexType>
    <element name="Deletion" type="m3w:DataChangeType"/>
    <complexType name="DataChangeType">
        <attribute name="object" type="m3w:DataTypeType" use="required"/>
        <attribute name="name" type="string" use="required"/>
    </complexType>
```

Figure 5:
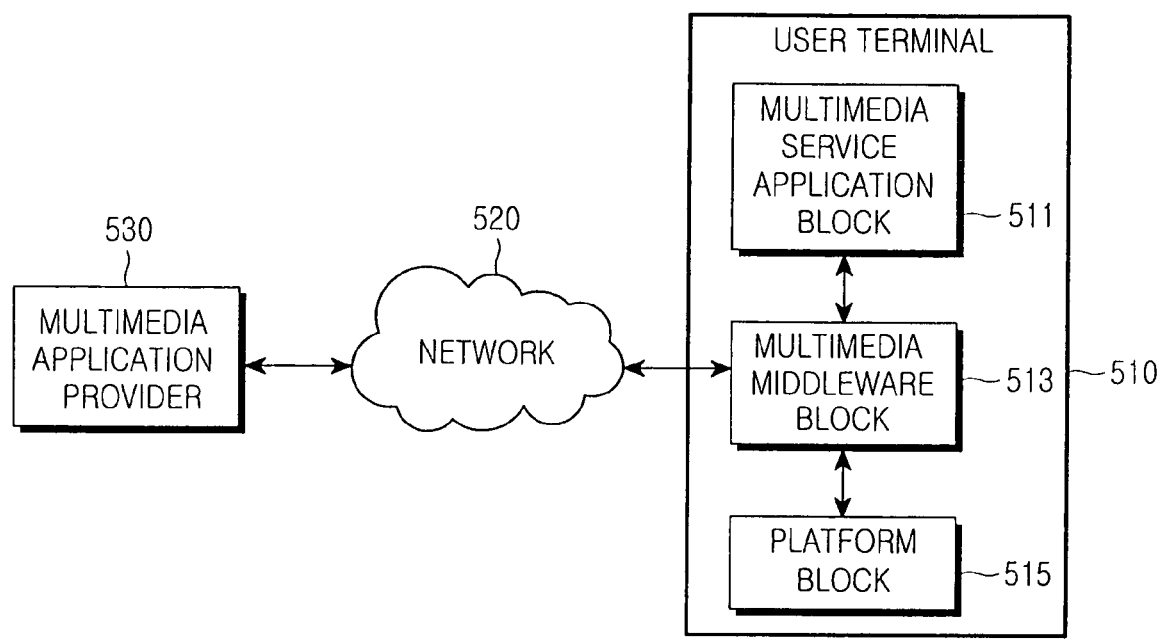
FIG. 5 is a block diagram illustrating a structure of a network system to which multimedia middleware using metadata is applied in accordance with an exemplary embodiment of the present invention.

FIG. 5 is a block diagram illustrating a structure of a network system to which multimedia middleware using metadata is applied in accordance with an exemplary embodiment of the present invention. FIG. 5 illustrates an application framework of the system including a user terminal 510, a network 520, and a multimedia application provider 530.

In FIG. 5, the terminal 510 is a wired terminal (for example, a computer with a network access means) or a wireless terminal (for example, a cellular phone, personal communications service (PCS) phone, personal digital assistant (PDA), an international mobile telecommunications-2000 (IMT-2000) phone, PDA phone, or smart phone). The network 520 with an exemplary embodiment of the present invention. The metadata required to run a multimedia application transmitted through the network 520 is received in a metadata transmission and reception section 5131. A service metadata parser 5132 parses the received metadata and then outputs the parsed metadata to the service management section 5133. The service management section 5133 identifies a service implementation code required for the associated multimedia middleware service from the parsed metadata and acquires the associated service implementation code through a service implementation code acquisition section 5134. In this case, the associated service implementation code may be downloaded or copied through a storage medium. The service implementation code acquired by the service implementation code acquisition section 5134 is installed/deleted/updated (or changed) in a service implementation code layer 5137 through a service implementation code installation/deletion/update (or change) section 5135.

The change of the service implementation code has the generic meaning for installation, deletion, and update operations. In a process for installing the acquired service implementation code, the service management section 5133 determines whether the acquired service implementation code is related to a standard or non-standard service. If the acquired service implementation code is related to the standard service as a determination result, the service management section 5133 verifies validity of the code by comparing the acquired service implementation code with metadata of the standard service. If the acquired service implementation code is valid as a verification result, the service management section 5133 enables the acquired service implementation code to be installed in the service implementation code layer 5137. After the acquired service implementation code is installed, the service management section 5133 registers metadata of the associated standard service in an available service list.

Further, if the multimedia application is related to the non-standard service, the service management section 5133 receives metadata of the non-standard service through the service metadata transmission and reception section 5131, acquires a service implementation code of the associated non-standard service through the service implementation acquisition section 5134, applies the acquired service implementation code to the service implementation code layer 5137, and registers the metadata of the associated non-standard service in an available service list.

When a partial multimedia API of the multimedia middleware service is added/deleted/updated, the service management section 5133 adds/deletes/updates (or changes) the associated multimedia API in the service metadata. The service management section 5133 acquires a service implementation code of the changed multimedia API through the service implementation acquisition section 5134 and applies the acquired service implementation code to the service implementation code layer 5137 through the service implementation code change section 5135. The multimedia middleware block 513 initializes and prepares a multimedia middleware service required to run a multimedia application through a service preparation section 5136. When the multimedia application runs, the multimedia middleware service can be called.

The multimedia middleware block 513 of an exemplary embodiment of the present invention can add metadata of the multimedia middleware service and can add a new service to a service list. Alternatively, the multimedia middleware block 513 can change and delete an existing service.

Figure 7:
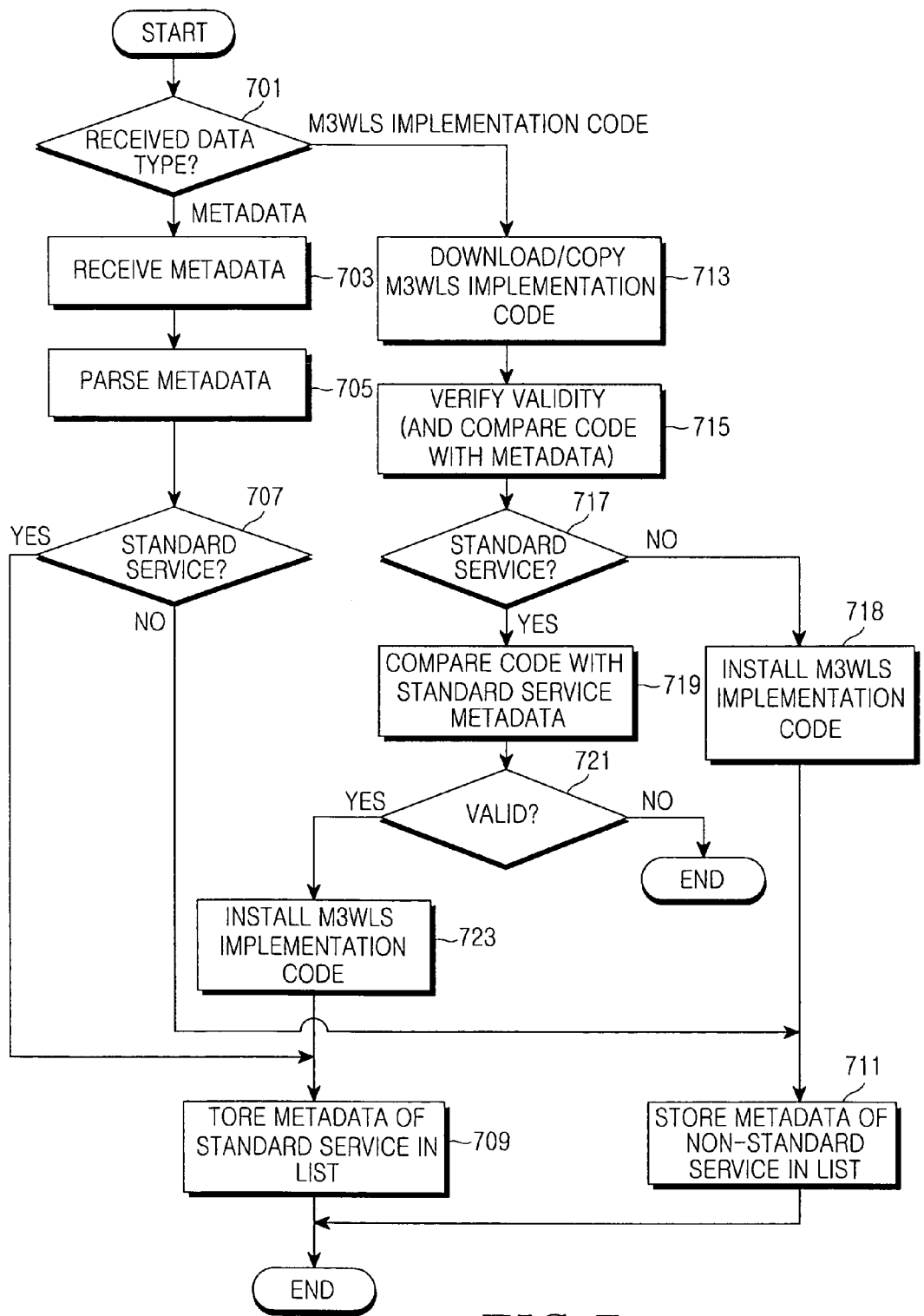
FIG. 7 is a flowchart illustrating a method for managing multimedia middleware using metadata in accordance with an exemplary embodiment of the present invention.

FIG. 7 is a flowchart illustrating a method for managing multimedia middleware using metadata in accordance with an exemplary embodiment of the present invention. FIG. 7 illustrates an operation of the multimedia middleware block 513 of the terminal 510.

In step 701, the service management section 5133 of the multimedia middleware block 513 identifies a type of externally received data. In step 703, when the received data is metadata for a multimedia application, the service metadata transmission and reception section 5131 receives the associated metadata. In step 705, the service management section 5133 parses the received metadata through the service metadata parser 5132. In step 707, the service management section 5133 determines whether the received metadata is related to a standard or non-standard service and identifies a service implementation code needed for the associated service. If the received metadata is related to the standard service, the service management section 5133 registers the metadata of the associated standard service in an available service list in step 709. On the other hand, if the received metadata is related to the non-standard service, the service management section 5133 registers the metadata of the associated non-standard service in an available service list in step 711.

On the other hand, the service management section 5133 of the multimedia middleware block 513 identifies a type of externally received data in step 701. When the received data is a service implementation code of metadata (M3WLS) needed for an associated service, the service management section 5133 acquires the associated service implementation code through the service implementation code acquisition section 5134 in step 713. In this case, the associated service implementation code is downloaded or copied through a storage medium. In step 715, the service management section 5133 verifies the validity of the code by comparing the service implementation code with the associated metadata. If the service implementation code is related to a standard service as a verification result in step 717, the validity of the code is verified by comparing the code with the standard service metadata in step 719. If the code is a valid service implementation code suitable for the standard in step 721, the service management section 5133 enables the code to be installed in the service implementation code layer 5137 in step 723. After the acquired service implementation code is installed, the service management section 5133 registers metadata of the associated standard service in an available service list in step 709. On the other hand, if the service implementation code is related to a non-standard service as the determination result in step 717, the service management section 5133 omits a validity check. In step 718, the associated service implementation code is installed in the service implementation code layer 5137. The metadata of the associated non-standard service is registered in the available service list.

Step 715 in which the validity verification is performed and step 719 in which the service implementation code is compared with the metadata of the standard service can be selectively performed or integrated into one step.

As described above, an open multimedia middleware structure expresses name, configuration, version and API update information in the form of an XML schema such that a multimedia middleware service can be modeled. Metadata for the multimedia middleware service structure based on a model of an XML schema form is generated. A multimedia middleware block manages metadata of service structure information. The associated service metadata and the associated service list can be referred to and updated when an implementation module (or service implementation code) of a new standard or non-standard service is installed to run a multimedia application in a terminal or when a service implementation code of an existing standard or non-standard service is deleted and changed.

Further, exemplary embodiments of the present invention can record and use a program or algorithm capable of providing an open middleware structure in a storage medium capable of being embedded in a particular device such that the implementation of a standard or non-standard service can be effectively managed in multimedia middleware. The storage medium can be read by a device such as a computer, and the like.

As is apparent from the above description, the exemplary embodiments of the present invention can easily add, delete or change a service and can effectively maintain and manage middleware components, by modeling an information structure of a name, configuration, version and API update of a multimedia middleware service in the form of metadata.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A multimedia middleware apparatus of a terminal for supporting a multimedia application, the apparatus comprising:
    a receiver for receiving metadata comprising middleware application programming interface (API) information as structural information of a multimedia middleware service to run a multimedia application; and
    a processor for
        parsing the metadata,
        identifying a service implementation code for the multimedia middleware service from the received metadata,
        acquiring the service implementation code,
        determining whether the metadata and the service implementation code are related to at least one of a standard service and a non-standard service, and
        according to the determination result, applying the acquired service implementation code to change the multimedia application based on the acquired service implementation code and the metadata,
    wherein the processor is further configured to verify validity by comparing the service implementation code with associated metadata when the service implementation code is related to the standard service and to apply a valid service implementation code to an associated multimedia middleware service.

2. The multimedia middleware apparatus of claim 1, wherein the receiver receives the metadata from a server of a multimedia application provider connected through a communication network.

3. The multimedia middleware apparatus of claim 1, wherein the receiver downloads the metadata through a storage medium.

4. The multimedia middleware apparatus of claim 1, wherein the metadata further comprises change information of a middleware API corresponding to at least one of installation, deletion and update information of the middleware API, the change information of the middleware API being applied to an associated multimedia middleware service by the processor.

5. The multimedia middleware apparatus of claim 1, wherein the metadata further comprises a middleware service container for providing information regarding a set of the multimedia middleware service.

6. The multimedia middleware apparatus of claim 5, wherein the middleware service container comprises multimedia middleware service method information for describing associated API information and parameter information for describing an associated parameter in each multimedia middleware service.

7. The multimedia middleware apparatus of claim 1, wherein the metadata further comprises change history information comprising at least one of addition information, modification information and deletion information.

8. The multimedia middleware apparatus of claim 7, wherein the middleware API information to be at least one of added, modified and deleted in the change history information comprises at least one of information regarding multimedia middleware service parameter class types, information regarding multimedia middleware services to be supported, and information regarding multimedia middleware service methods.

9. A method for controlling multimedia middleware of a terminal for supporting a multimedia application, the method comprising:
    receiving metadata comprising middleware application programming interface (API) information as structural information of a multimedia middleware service to run a multimedia application on the terminal, wherein the middleware API information is related to changing the multimedia application;
    parsing the metadata, identifying a service implementation code for the multimedia middleware service from the parsed metadata, and acquiring the service implementation code;
    determining whether the metadata and the service implementation code are related to at least one of a standard service and a non-standard service;
    verifying validity by comparing the service implementation code with associated metadata when the service implementation code is related to the standard service; and
    according to the determination result, applying the acquired service implementation code to change the multimedia application based on the acquired service implementation code and the metadata.

10. The method of claim 9, wherein the metadata is received from a server of a multimedia application provider connected through a communication network.

11. The method of claim 9, wherein the metadata is downloaded through a storage medium.

12. The method of claim 9, wherein the metadata further comprises change information of a middleware API corresponding to at least one of installation, deletion and update information of the middleware API, and the method further comprising applying the change information of the middleware API to an associated multimedia middleware service.

13. The method of claim 9, wherein the metadata further comprises a middleware service container for providing information regarding a set of the multimedia middleware service.

14. The method of claim 13, wherein the middleware service container comprises multimedia middleware service method information for describing associated API information and parameter information for describing an associated parameter in each multimedia middleware service.

15. The method of claim 9, wherein the metadata further comprises change history information comprising at least one of addition information, modification information and deletion information.

16. The method of claim 15, wherein the middleware API information to be at least one of added, modified and deleted in the change history information comprises at least one of information regarding multimedia middleware service parameter class types, information regarding multimedia middleware services to be supported, and information regarding multimedia middleware service methods.

17. A non-transitory storage medium for recording multimedia middleware for supporting a multimedia application comprising:
   a service metadata reception section for receiving metadata comprising middleware application programming interface (API) information as structural information of a multimedia middleware service to run a multimedia application on the terminal, wherein the middleware API information is related to changing the multimedia application;
   a service implementation code acquisition section for parsing the metadata and acquiring the service implementation code; and
   a service management section for identifying the service implementation code for the multimedia middleware service from the metadata, determining whether the metadata and the service implementation code are related to at least one of a standard service and a non-standard service, and according to the determination result, controlling an operation for applying the service implementation code to change the multimedia application based on the acquired service implementation code and the metadata,
   wherein the service management section is further configured to verify validity by comparing the service implementation code with associated metadata when the service implementation code is related to the standard service and to apply a valid service implementation code to an associated multimedia middleware service.

18. The storage medium of claim 17, wherein the service metadata reception section is implemented to receive the metadata from a server of a multimedia application provider connected through a communication network.

19. The storage medium of claim 17, wherein the service metadata reception section is implemented to download the metadata through a storage medium.

20. The storage medium of claim 17, wherein the metadata further comprises change information of a middleware API corresponding to at least one of installation, deletion and update information of the middleware API, the change information of the middleware API being applied to an associated multimedia middleware service by the service management section.

21. The storage medium of claim 17, wherein the metadata further comprises a middleware service container for providing information regarding a set of the multimedia middleware service.

22. The storage medium of claim 21, wherein the middleware service container comprises multimedia middleware service method information for describing associated API information and parameter information for describing an associated parameter in each multimedia middleware service.

23. The storage medium of claim 17, wherein the metadata further comprises change history information comprising at least one of addition information, modification information and deletion information.

24. The storage medium of claim 23, wherein the middleware API information to be at least one of added, modified and deleted in the change history information comprises at least one of information regarding multimedia middleware service parameter class types, information regarding multimedia middleware services to be supported, and information regarding multimedia middleware service methods.

25. A non-transitory computer-readable recording medium storing a computer program code for performing a method for controlling multimedia middleware of a terminal for supporting a multimedia application, the code comprising executable instructions for:
   receiving metadata comprising middleware application programming interface (API) information as structural information of a multimedia middleware service to run a multimedia application on the terminal, wherein the middleware API information is related to changing the multimedia application;
   parsing the metadata, identifying a service implementation code for the at least one multimedia middleware service from the parsed metadata, and acquiring the service implementation code;
   determining whether the metadata and the service implementation code are related to at least one of a standard service and a non-standard service;
   verifying validity by comparing the service implementation code with associated metadata when the service implementation code is related to the standard service; and
   according to the determination result, applying the acquired service implementation code to change the multimedia application based on the acquired service implementation code and the metadata.

* * * * *